(12) United States Patent
Ha et al.

(10) Patent No.: US 10,018,867 B2
(45) Date of Patent: Jul. 10, 2018

(54) NANO CAPSULE LIQUID CRYSTAL LAYER AND LIQUID CRYSTAL DISPLAY DEVICE INCLUDING THE SAME

(71) Applicant: LG Display Co., Ltd., Seoul (KR)

(72) Inventors: Kyung-Su Ha, Gwanju (KR); Kyeong-Jin Kim, Gyeonggi-do (KR); Ji-Na Jeon, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/361,656

(22) Filed: Nov. 28, 2016

(65) Prior Publication Data

US 2017/0192265 A1    Jul. 6, 2017

(30) Foreign Application Priority Data

Nov. 30, 2015    (KR) .................. 10-2015-0169521

(51) Int. Cl.
*G02F 1/1333*    (2006.01)
*G02F 1/1334*    (2006.01)
*G02F 1/1335*    (2006.01)
*G02F 1/1343*    (2006.01)
*G02F 1/1337*    (2006.01)

(52) U.S. Cl.
CPC ...... *G02F 1/1334* (2013.01); *G02F 1/133528* (2013.01); *G02F 1/133703* (2013.01); *G02F 1/134309* (2013.01); *G02F 1/134363* (2013.01); *G02F 2001/133531* (2013.01); *G02F 2202/36* (2013.01)

(58) Field of Classification Search
CPC ............. G02F 1/1334; G02F 1/133528; G02F 1/134309; G02F 1/133703; G02F 1/134363; G02F 2001/133531; G02F 2202/36

USPC .......................................................... 349/88
See application file for complete search history.

(56) References Cited

U.S. PATENT DOCUMENTS

| 6,203,723 | B1 | 3/2001 | Hsu |
| 2002/0001052 | A1 | 1/2002 | Kornfield et al. |
| 2005/0185105 | A1 | 8/2005 | Miyachi et al. |

(Continued)

FOREIGN PATENT DOCUMENTS

| CN | 102540544 A | 7/2012 |
| CN | 102662269 A | 9/2012 |

(Continued)

OTHER PUBLICATIONS

Communication dated Mar. 24, 2017 from the European Patent Office in counterpart European application No. 16201078.9.

(Continued)

*Primary Examiner* — Charles Chang
(74) *Attorney, Agent, or Firm* — Morgan, Lewis & Bockius LLP

(57) ABSTRACT

A nano capsule liquid crystal layer and a liquid crystal display having the same are provided. The nano capsule liquid crystal layer includes a buffer layer and a plurality of nano capsules disposed in the buffer layer. An inside of each of the nano capsules includes liquid crystal molecules, and additives each having a center molecule and at least two first peripheral molecules connected to the center molecule and spaced apart from each other, and that are mixed with the liquid crystal molecules. The first peripheral molecules have a same phase as the liquid crystal molecule.

16 Claims, 7 Drawing Sheets

(a)

(b)

(56) References Cited

U.S. PATENT DOCUMENTS

| | | | |
|---|---|---|---|
| 2007/0080370 A1* | 4/2007 | Miyachi | G02F 1/13624 |
| | | | 257/107 |
| 2008/0186563 A1 | 8/2008 | Chen | |
| 2012/0113363 A1* | 5/2012 | Lim | G02F 1/1334 |
| | | | 349/96 |
| 2012/0162596 A1* | 6/2012 | Chen | G02F 1/133703 |
| | | | 349/199 |
| 2012/0264881 A1* | 10/2012 | Lancaster | C08F 2/38 |
| | | | 525/193 |
| 2014/0184984 A1 | 7/2014 | Kim et al. | |
| 2015/0109547 A1 | 4/2015 | Kim et al. | |

FOREIGN PATENT DOCUMENTS

| | | |
|---|---|---|
| CN | 104570510 A | 4/2015 |
| KR | 10-2005-0076670 | 7/2005 |
| KR | 10-2014-0088470 A | 7/2014 |
| WO | 2012/060620 A2 | 5/2012 |

OTHER PUBLICATIONS

Ahn et al., "Control of liquid crystal pretilt angles by using organic/inorganic hybrid interpenetrating networks", Optics Express, vol. 17, No. 19, pp. 16603-16612, Sep. 14, 2009.

Hahn, "Light Scattering Theory", Department of Mechanical and Aerospace Engineering, University of Florida, Jul. 2009.

First Office Action dated Aug. 16, 2017 from the Taiwan Patent Office in related Taiwanese application No. 105138935.

First Office Action dated Aug. 16, 2017 from the Taiwan Patent Office in related Taiwanese application No. 105138935 (already of record).

* cited by examiner (a)  (b)

NANO CAPSULE LIQUID CRYSTAL LAYER AND LIQUID CRYSTAL DISPLAY DEVICE INCLUDING THE SAME

The present application claims the priority benefit of Korean Patent Application No. 10-2015-0169521 filed in the Republic of Korea on Nov. 30, 2015, which is hereby incorporated by reference in its entirety for all purposes as if fully set forth herein.

BACKGROUND

Field of the Invention

The present invention relates to a liquid crystal display device (LCD), and more particularly, to an LCD including a nano capsule liquid crystal layer.

Discussion of the Related Art

With the advancement of information society, display technology for displaying images based on electric information signals has rapidly advanced. Accordingly, as flat display devices with advantages of thin profile, light weight, and low power consumption, a liquid crystal display (LCD) device, a plasma display panel (PDP) device, an electroluminescent display (ELD) device, a field emission display (FED) device, and the like have been introduced and have rapidly replaced the cathode ray tube (CRT) device.

Among the flat display devices, LCDs are most widely used in laptops, monitors, televisions (TVs) because they are excellent in displaying moving images and a high contrast ratio. FIG. 1 is a cross-sectional view illustrating an LCD according to the related art.

As shown in FIG. 1, a related art LCD 10 includes a liquid crystal panel having a first substrate 2, and a second substrate 4 attached to the first substrate 2 with a liquid crystal layer 50 therebetween, and a backlight 60. Here, a thin film transistor Tr on the first substrate 2, which includes a gate electrode 12, a gate insulating layer 13, an active layer 14, ohmic contact layers 15a and 15b, and source and drain electrodes 16 and 17, is connected to a first electrode 19 in a pixel region 19 through a contact hole formed in an inter-layered insulating film 18.

Further, a black matrix 32 is below the second substrate 4, and has a lattice shape to surround the pixel region P such that the black matrix 32 shields a non-display element such as the thin film transistor Tr and exposes the first electrode 19. Additionally, a color filter 34 is arranged in the lattice-shaped black matrix 32 corresponding to the pixel region P, and a second electrode is arranged to cover the black matrix 32 and the color filter 34. Polarizing plates 20 and 30 each selectively transmitting a predetermined polarized light are attached below the first substrate 2 and on the second substrate 4, respectively.

Further, a first alignment layer 31a having a surface rubbed in a predetermined direction is between the liquid crystal layer 50 and the first electrode 19, and a second alignment layer 31b having a surface rubbed in a predetermined direction is between the liquid crystal layer 50 and the second electrode 36, and thus, an initial arrangement state and an alignment direction of liquid crystal molecules are uniform. To prevent leakage of the liquid crystal layer 50, a seal pattern 70 is arranged along edge portions of the first and second substrates 2 and 4.

Because the LCD 10 is not self-luminescent, the backlight 60 is arranged below the liquid crystal panel as a light source to supply light to the liquid crystal panel.

As the liquid crystal layer for the LCD 10, a nematic liquid crystal, a smetic liquid crystal, a cholesteric liquid, or the like is used. The nematic liquid crystal is most commonly used.

However, in the related art LCD 10, there is an disadvantage that an alignment process when attaching the two substrates 2 and 4 is additionally required after the substrates 2 and 4 are individually manufactured. Further, processes of printing and rubbing the alignment layers 31a and 31b to align the liquid crystal are required, and due to these processes, production rate is reduced. Moreover, a gap between the two substrates 2 and 4 needs to be maintained after attaching the substrates 2 and 4 and injecting the liquid crystal between the substrates 2 and 4, and if a gap between the two substrates changes by an external pressure or impact, display quality may be degraded.

SUMMARY

Accordingly, the present invention is directed to a liquid crystal display device (LCD) that substantially obviates one or more of the problems due to limitations and disadvantages of the related art.

An object of the present invention is to provide an LCD that can reduce a driving voltage to drive a nano capsule liquid crystal layer.

Additional features and advantages of the disclosure will be set forth in the description which follows, and in part will be apparent from the description, or may be learned by practice of the disclosure. The advantages of the disclosure will be realized and attained by the structure particularly pointed out in the written description and claims as well as the appended drawings.

To achieve these and other advantages, and in accordance with the purpose of the present invention, as embodied and broadly described herein, a nano capsule liquid crystal layer comprises a buffer layer; a plurality of nano capsules disposed in the buffer layer, an inside of each of the nano capsules including liquid crystal molecules, and additives each having a center molecule and at least two first peripheral molecules connected to the center molecule and spaced apart from each other, and that are mixed with the liquid crystal molecules, wherein the first peripheral molecules have a same phase as the liquid crystal molecule.

In another aspect, a liquid crystal display device comprises a substrate; first and second electrodes spaced apart from each other on the substrate; a nano capsule liquid crystal layer that is on the first and second electrodes, the nano capsule liquid crystal layer having a buffer layer and a plurality of nano capsules disposed in the buffer layer, an inside of each of the nano capsules including liquid crystal molecules, and additives each having a center molecule and at least two first peripheral molecules connected to the center molecule and spaced apart from each other, and that are mixed with the liquid crystal molecules; and first and second polarizing plates having first and second polarization axes, respectively, that are perpendicular to each other, such that the first polarizing plate is below the substrate, and the second polarizing plate is on the nano capsule liquid crystal layer, wherein the first peripheral molecules have a same phase as the liquid crystal molecule.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure. In the drawings.

DETAILED DESCRIPTION

Reference will now be made in detail to embodiments, examples of which are illustrated in the accompanying drawings. The same or like reference numbers may be used throughout the drawings to refer to the same or like parts.

Figure 2:
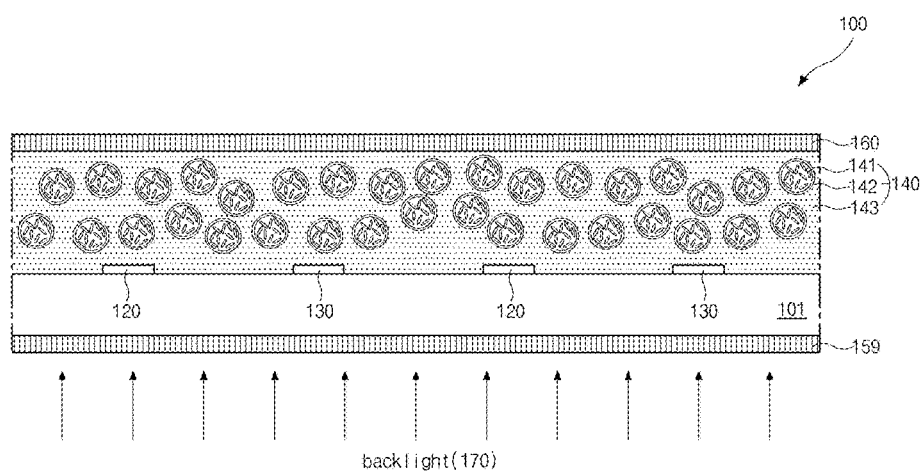
FIG. 2 is a cross-sectional view illustrating an LCD according to an example embodiment of the present invention.

FIG. 2 is a cross-sectional view illustrating an LCD according to an example embodiment of the present invention.

As shown in FIG. 2, the LCD 100 may include a substrate 101, first and second electrodes 120 and 130 on the substrate 101, a nano capsule liquid crystal layer 140 on the first and second electrodes 120 and 130, and first and second polarizing plates 159 and 160 that are below the substrate 101 and on the nano capsule liquid crystal layer 140, respectively.

The nano capsule liquid crystal layer 140 is formed with nano capsules 142 that are dispersed in a buffer layer 143. The nano capsule 142 may have a size less than wavelengths of visible light and is filled with liquid crystal molecules 141 randomly arranged. The nano capsule liquid crystal layer 140 may be formed in a film type over the first and second electrodes 120 and 130.

Accordingly, unlike a related art LCD using two substrates, the LCD 100 of this example embodiment can be manufactured with one substrate 101, and thus, the LCD having a light weight and a thin profile can be achieved, thereby reducing production cost.

Further, the nano capsule liquid crystal layer 140 does not have the problem of the related art that the gap between the related art two substrates goes awry or changes by an external pressure or impact. Thus, when forming the substrate 101 using a flexible material, such as a plastic, the nano capsule liquid crystal layer 140 can be effectively applied to a flexible LCD.

Further, the nano capsule liquid crystal layer 140 has an optical isotropy when an electric field is not applied. However, the nano capsule liquid crystal layer 140 has an optical property that when an electric field is applied, the liquid crystal molecules 141 in the nano capsule 142 are aligned in a direction of the electric field and birefringence of a light incident on the nano capsule liquid crystal layer 140 is produced.

Accordingly, the nano capsule liquid crystal layer 140 can form an optical axis according to an applied electric field, and by controlling an optical property using this, a light can be transmitted.

Further, the first polarizing plate 159 produces a polarization of a light to be incident on the nano capsule liquid crystal layer 140 from the backlight 170. The second polarizing plate 160 blocks light that was incident on the nano capsule liquid crystal layer 140 and then passed through the nano capsule liquid crystal layer 140 without polarization by a birefringence effect of the nano capsule liquid crystal layer 140.

A polarization axis of the first polarizing plate 159 and a polarization axis of the second polarizing plate 160 are perpendicular to each other. For example, if the polarization axis of the first polarizing plate 159 has a 0 or 90 degree angle, the polarization axis of the second polarization plate 160 has a 90 or 0 degree angle.

An operation principle of the LCD 100 including the nano capsule liquid crystal layer 140 is explained below.

First, when an electric field is not induced between the first and second electrodes 120 and 130, the nano capsule liquid crystal layer 140 passes light received from the first polarizing plate 159 therethrough. Thus, the LCD 100 displays a black state because the second polarizing plate 160 will block the polarized light from the first polarizing palate 159.

In other words, in the OFF state with no electric field being applied, light entering the first polarizing plate 159 from the backlight 170 is selectively transmitted at a specific polarization angle while passing through the first polarization plate 159. Then, the light entering the nano capsule liquid crystal layer 140 is transmitted through the nano capsule liquid crystal layer 140 with hardly any scattering phenomenon, and then, the light reaches the second polarizing plate 160. Finally, a light passing through the first polarization plate 159 having the polarization axis of, for example, 0 degrees enters the second polarization plate 160 having the polarization axis of, for example, 90 degrees. Thus, the light is blocked by the second polarizing plate 160 perpendicular in polarizing axis to the first polarizing plate 159, and therefore, the LCD 100 displays the black state.

As described above, unlike the related art LCD requiring that a pair of alignment layers are arranged on a pair of substrates opposing to each other, respectively, and a liquid crystal is injected between the substrates and is aligned to have predetermined pitch and direction, the LCD 100 of this example embodiment can display the black state using the optical property of the nano capsule liquid crystal layer 140 and, thus, does not additionally require an alignment of a liquid crystal.

Accordingly, the LCD 100 of this example embodiment can eliminate processes of printing and rubbing an alignment layer that the related art LCD necessarily requires.

When an electric field is induced between the first and second electrodes 120 and 130, the nano capsule liquid crystal layer 140 rotates a polarization axis of light passing through the nano capsule liquid crystal layer 140 from the first polarization plate 159 by 90 degrees. Thus, the LCD 100 displays a white state.

In detail, in the ON state with the electric field being induced, because the liquid crystal molecules 141 in the nano capsule 142 are arranged in parallel with a direction of the electric field, a birefringence effect by the alignment of the liquid crystal molecules 141 is produced.

In this case, a light entering the nano capsule liquid crystal layer 140 through the first polarizing plate 159 changes in polarization by the birefringence effect of the nano capsule liquid crystal layer 140. When a retardation, Δn*d, of the nano capsule liquid crystal layer 140 meets a λ/2 condition of a light incident thereon, a polarization axis of the incident light is rotated by 90 degrees angle. Thus, this light is not absorbed by the second polarizing plate 160 perpendicular in polarization axis to the first polarizing plate 159 and passes through the second polarizing plate 160, and the LCD 100 displays the white state.

As a size of the nano capsule 142 increases, a light scattering may happen between the nano capsules 142 or liquid crystal molecules 141 and a full black state is not displayed in an off state of no electric field being applied. Accordingly, the nano capsule 142 may have a size less than wavelengths of a visible light.

Figure 1:
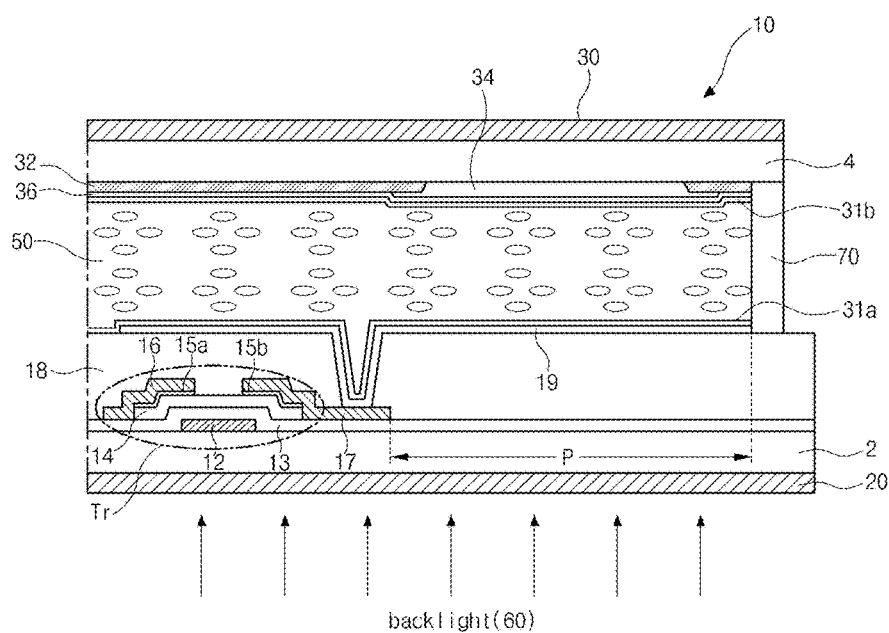
FIG. 1 is a cross-sectional view illustrating an LCD according to the related art.

Further, because the liquid crystal molecules 141 are located in the nano capsule 142, an attraction force between the liquid crystal molecules 141 and an attraction force between the liquid crystal molecule 141 and the nano capsule 142 are strong. As such, a driving voltage to drive the nano capsule liquid crystal layer 140 is much greater than that of the related art LCD 10 of FIG. 1.

To reduce the driving voltage, by adding impurities into the nano capsule 142, an attraction force between the liquid crystal molecules 141 and an attraction force between the liquid crystal molecule 141 and the nano capsule 142 can be reduced.

However, because of the added impurities, a physical property of the liquid crystal including the liquid crystal molecules 141 may change, and a driving available temperature (Tni) of the nano capsule liquid crystal layer 140 may be decreased.

Accordingly, reliability and driving properties of the LCD 100 may be degraded, and particularly, a display quality at a high temperature may be degraded.

Figure 3:
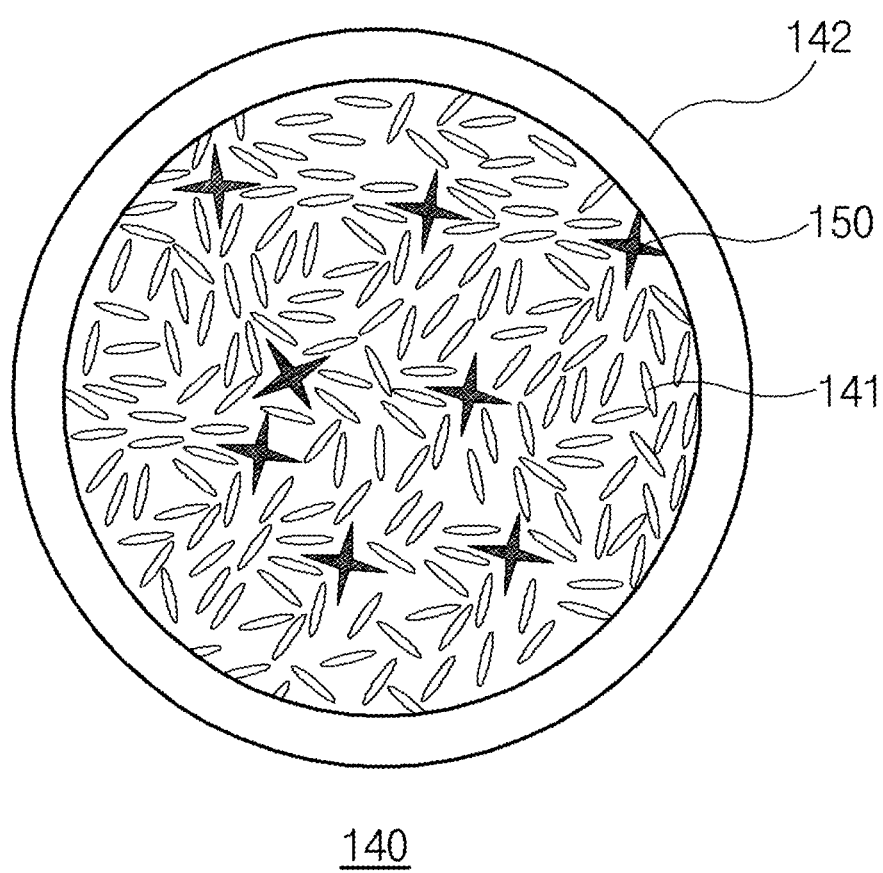
FIG. 3 is a view illustrating a nano capsule according to an example embodiment of the present invention.
Figure 4:
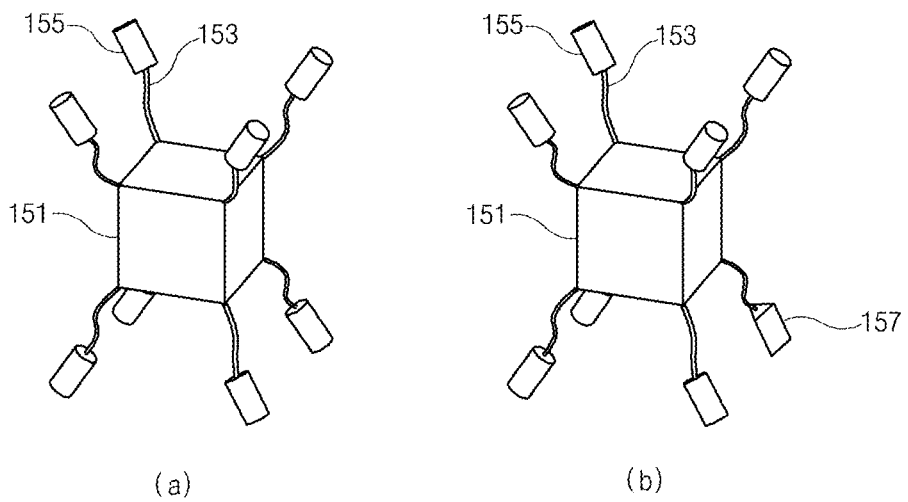
FIG. 4 is a view illustrating additives in the nano capsule of FIG. 3.
Figure 5:
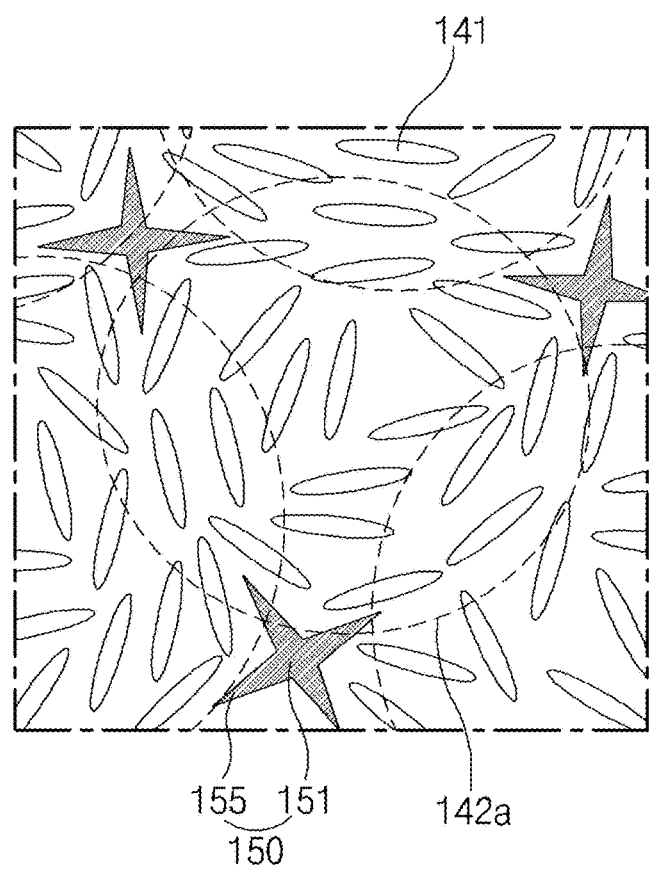
FIG. 5 is a view illustrating a portion of the nano capsule of FIG. 3.

FIG. 3 is a view illustrating a nano capsule according to an example embodiment of the present invention, FIG. 4 is a view illustrating additives in the nano capsule of FIG. 3, and FIG. 5 is a view illustrating a portion of the nano capsule of FIG. 3.

In FIG. 3, the nano capsule 142 includes liquid crystal molecules 141 filling the inside of the nano capsule 142, and additives 150 mixed with the liquid crystal molecules 141. Here, the nano capsule 142 has a nano size less than wavelengths of a visible light. The nano capsule 142 may be made of one selected from a transparent silicon material group consisting of silicon nitride (SiNx) or silicon oxide (SiO2), or one selected from a transparent polymer group consisting of polystyrene, poly ethylene, poly urethane, poly chloride vinyl, poly methyl methane acrylate, poly carbonate epoxy resin, and poly vinyl acrylate. The liquid crystal molecules 141 are arranged randomly in the nano capsule 142, and may be made of a nematic liquid crystal, smetic liquid crystal, or cholesteric liquid crystal.

With reference to FIG. 4, the additive 150 may include a center molecule 151 and at least two first peripheral molecules 155 that each are connected to the center molecule 151 and are spaced apart from each other. The first peripheral molecule 155 may have the same phase and property as the liquid crystal molecule 141. Accordingly, the first peripheral molecule 155 is easily mixed with the liquid crystal molecule 141, and a physical property of the liquid crystal including the first peripheral molecule 155 and its adjacent liquid crystal molecule 141 does not change.

The center molecule 151 functions to support the first peripheral molecule 155. Because the center molecule 151 does not contact the liquid crystal molecule 141 by the first peripheral molecule 155, it is uniformly mixed with the liquid crystal molecule 141 and behaves like the same material.

Further, the center molecule 151 may have a linear structure, plate structure, or three-dimensional structure. The first peripheral molecules 155 connected to the center molecule 151 are located in different directions so that the additive 150 can have a three-dimensional structure.

Accordingly, as shown in FIG. 5, the peripheral molecules 155 of the additive 150 break random arrangement of the liquid crystal molecules 141 around the first peripheral molecules 155 and make the liquid crystal molecules 141 around the first peripheral molecules 155 arranged regularly in an arrangement direction of the first peripheral molecules 155 such that the liquid crystal molecules 141 form a shape of a virtual sphere 142a in the nano capsule 142.

In this case, the neighboring virtual spheres 142a overlap each other and spare the liquid crystal molecules 141 included therein. The virtual sphere 142a formed by the first peripheral molecules 155 can show an effect like forming the nano capsule 142 in a small size. In other words, because the nano capsule 142 is divided into virtual spheres 142a having a size less than that of the nano capsule 142, a light scattering between the nano capsules 142 or between the liquid crystal molecules 141 can be prevented, and a full black can be displayed in an OFF state of no electric field being applied.

Further, by not reducing a size of the nano capsule 142 and filling it with the liquid crystal molecules 141 but forming the virtual spheres 142a in the nano capsule 142 having a predetermined size, an effect like size reduction is shown. Accordingly, an attraction force between the liquid crystal molecules 141 and an attraction force between the nano capsule 142 and the liquid crystal molecule 141 are not strong, and thus a driving voltage to drive the nano capsule liquid crystal layer 140 does not rise.

Further, because the first peripheral molecule 155 has the same phase and property as the liquid crystal molecule 141, the physical property of the liquid crystal molecule 141 can be prevented from changing, and a phenomenon of the driving available temperature (Tni) of the nano capsule liquid crystal layer 140 being lowered can be prevented.

Table 1 shows a driving available temperature (Tni) and a refractive index variant (Δn) of the nano capsule liquid crystal layer 140 according to wt % of the additives 150 to the liquid crystal molecules 141.

TABLE 1

|         | 0.0 wt % | 0.1 wt % | 1 wt % | 1.25 wt % | 1.5 wt % |
|---------|----------|----------|--------|-----------|----------|
| Tni(° C.) | 89.9   | 89.9     | 89.9   | 89.4      | 88.7     |
| Δn      | 0.2493   | 0.2492   | 0.2491 | 0.2471    | 0.2450   |

With reference to Table 1, in a case of adding the additives 150 with a certain amount (0.1 wt %, 1 wt %, 1.25 wt %, and 2.5 wt %) compared with a case of adding no additives 150, the driving available temperature (Tni) and the refractive index variant (Δn) does not change much.

However, when the additives 150 are contained greater than the liquid crystal molecules 141 in the nano capsule 142, a fluidity of the liquid crystal molecules 141 is reduced and a driving efficiency is reduced. Accordingly, wt % of the additives 150 may be 0.01 to 25 wt % to the liquid crystal molecules 141. The size of the additive 150 is 2 nm to 100 nm, which is greater than the liquid crystal molecule 141 and is less than the nano capsule 142.

In portion (a) of FIG. 4, the additive 150 may include the center molecule 151 and first peripheral molecules 155 connected to the center molecule 151. Alternatively, as shown in portion (b) of FIG. 4, the additive 150 may include the center molecule 151 and first and second peripheral molecules 155 and 157 connected to the center molecule 151. The second peripheral molecule 157 has a property different from the liquid crystal molecule 141, and the first peripheral molecule 155 may be made of an organic material and the second peripheral molecule 157 may be made of an inorganic material.

Particularly, in the case that the additive 150 includes the center molecule 151 and the first and second peripheral molecules 155 and 157, because the second peripheral molecules 157 has a phase and a property different from the liquid crystal molecule 141, the fluidity of the liquid crystal molecules 141 can increase. In other words, because the second peripheral molecules 157 are not easily mixed with the liquid crystal molecules 141, the liquid crystal molecule 141 can be made fluid by a repulsive force between the second peripheral molecule 157 and the liquid crystal molecule 141.

When the fluidity of the liquid crystal molecules 141 increases, the liquid crystal molecules 141 can be rotated rapidly in an ON state of an electric field being applied, and a response speed can be improved.

Further, worth reference to portions (a) and (b) of FIG. 4, the additive 150 may further include connection molecules 153 connecting the center molecule 151 with the first peripheral molecules 155 or the first and second peripheral molecules. In other words, a dendrimer structure is formed by the combination of the center molecule 151 and the connection molecules 153, and the center molecule 151 is connected indirectly with the peripheral molecules through the connection molecules 153. Alternatively, the center molecule 151 may has a dendrimer structure, and in this case, ends of the dendrimer of the center molecule 151 are combined with the respective peripheral molecules and the center molecule 151 is connected directly with the peripheral molecules. By adjusting a length of the connection molecule 143 or the dendrimer, or adjusting a size of the first peripheral molecule 155, the first peripheral molecule 155 can make its adjacent liquid crystal molecule 141 arranged regularly in a direction to the first peripheral molecule 155.

Figure 6:
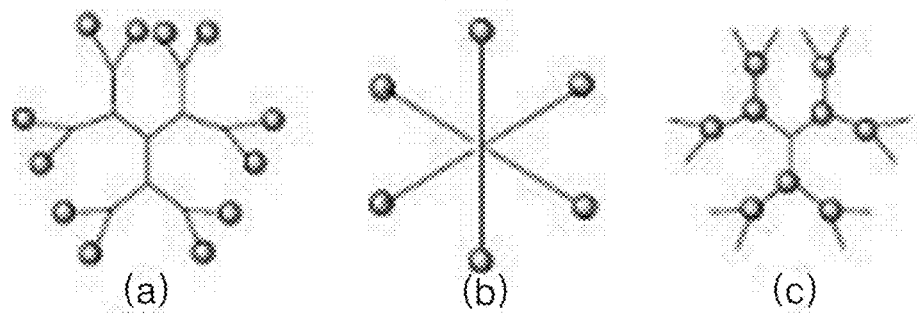
FIG. 6 is a view illustrating examples of a molecule having a dendrimer structure.

FIG. 6 is a view illustrating examples of a molecule having a dendrimer structure. As illustrated in FIG. 6, a molecule of a dendrimer structure has a form (a), (b), or (c) in which a unit structure of a tree branch shape are spread from a center.

Figure 7:
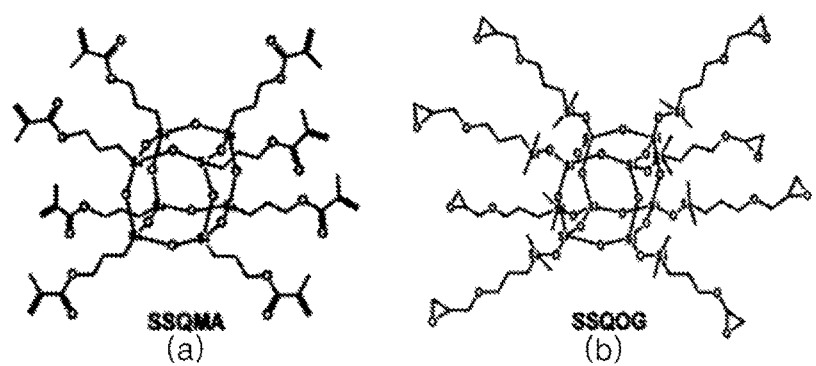
FIG. 7 is a view illustrating examples of a center molecule of an additive.

FIG. 7 shows SSQMA in portion (a) and SSQOG in portion (b), respectively as examples of a center molecule. In detail, each of the SSQMA and SSQOG has a three-dimensional structure of a cube, and includes a dendrimer extending from corners of the cube.

Accordingly, the first peripheral molecules 155 or the first and second peripheral molecules 155 and 157 are combined with the respective ends of the dendrimer of each of the SSQMA and SSQOG, and thus, the additive 150 is finally formed.

Figure 8:
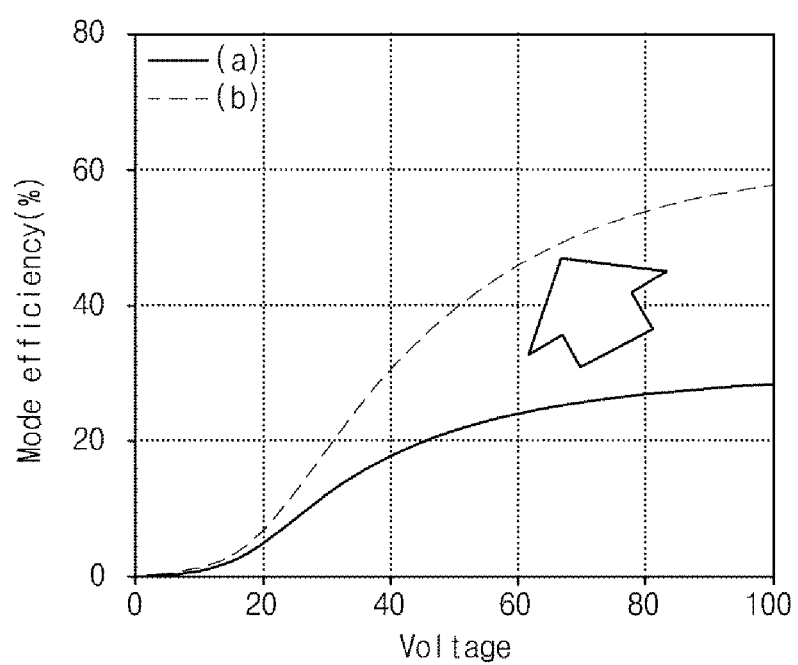
FIG. 8 is a graph illustrating an effect according to an example embodiment of the present invention.

FIG. 8 is a graph illustrating an effect according to an example embodiment of the present invention. With reference to FIG. 8, as compared with an arrangement (a) in which a nano capsule is filled only with liquid crystal molecules, an arrangement (b) in which additives are added has improved driving properties, black level, contrast ratio, and efficiency.

It will be apparent to those skilled in the art that various modifications and variations can be made in a display device of the present invention without departing from the sprit or scope of the disclosure. Thus, it is intended that the present invention covers the modifications and variations of this disclosure provided they come within the scope of the appended claims and their equivalents.

What is claimed is:

1. A nano capsule liquid crystal layer, comprising:
   a buffer layer;
   a plurality of nano capsules disposed in the buffer layer, an inside of each of the nano capsules including:
   liquid crystal molecules, and
   additives each having a center molecule and at least two first peripheral molecules connected to the center molecule and spaced apart from each other, and that are mixed with the liquid crystal molecules,
   wherein the first peripheral molecules have a same phase as the liquid crystal molecule, and
   wherein the center molecule does not contact the liquid crystal molecules by the first peripheral molecules.

2. The nano capsule liquid crystal layer of claim 1, wherein the center molecule has one of a linear structure, a plate structure, and a three-dimensional structure.

3. The nano capsule liquid crystal layer of claim 2, wherein the first peripheral molecules are located in different directions, and the additive has a three-dimensional structure.

4. The nano capsule liquid crystal layer of claim 1, wherein the additives each further have a second peripheral molecule that is connected to the center molecule and has a phase different from a phase of the first peripheral molecules.

5. The nano capsule liquid crystal layer of claim 4, wherein the center molecule has a dendrimer structure, and the first and second peripheral molecules are connected with ends of the dendrimer.

6. The nano capsule liquid crystal layer of claim 4, wherein the additives further include a connection molecule connecting the center molecule with each of the first and second peripheral molecules.

7. The nano capsule liquid crystal layer of claim 1, wherein the additive further includes a connection molecule connecting the center molecule with each of the first peripheral molecules.

8. The nano capsule liquid crystal layer of claim 1, wherein a wt % of the additives is 0.01 to 25 to the liquid crystal molecules.

9. A liquid crystal display device, comprising:
   a substrate;
   first and second electrodes spaced apart from each other on the substrate;
   a nano capsule liquid crystal layer that is on the first and second electrodes, the nano capsule liquid crystal layer having a buffer layer and a plurality of nano capsules disposed in the buffer layer, an inside of each of the nano capsules including:
   liquid crystal molecules, and
   additives each having a center molecule and at least two first peripheral molecules connected to the center molecule and spaced apart from each other, and that are mixed with the liquid crystal molecules; and
   first and second polarizing plates having first and second polarization axes, respectively, that are perpendicular to each other, such that the first polarizing plate is below the substrate, and the second polarizing plate is on the nano capsule liquid crystal layer, wherein the first peripheral molecules have a same phase as the liquid crystal molecule, and wherein the center molecule does not contact the liquid crystal molecules by the first peripheral molecules.

10. The liquid crystal display device of claim 9, wherein the additives each further have a second peripheral molecule that is connected to the center molecule and has a phase different from a phase of the first peripheral molecules.

11. The liquid crystal display device of claim 10, wherein the center molecule has a dendrimer structure, and the first and second peripheral molecules are connected with ends of the dendrimer.

12. The liquid crystal display device of claim 10, wherein the additive further includes a connection molecule connecting the center molecule with each of the first and second peripheral molecules.

13. The liquid crystal display device of claim 9, wherein the additive further includes a connection molecule connecting the center molecule with each of the first peripheral molecules.

14. The liquid crystal display device of claim 9, wherein a wt % of the additives is 0.01 to 25 to the liquid crystal molecules.

15. The liquid crystal display device of claim 9, wherein the center molecule has one of a linear structure, a plate structure, and a three-dimensional structure.

16. The liquid crystal display device of claim 15, wherein the first peripheral molecules are located in different directions, and the additive has a three-dimensional structure.

* * * * *